United States Patent [19]

Ganster et al.

[11] 4,347,577

[45] Aug. 31, 1982

[54] FEEDSTOCK TEMPERATURE CONTROL SYSTEM

[75] Inventors: Charles A. Ganster, Houston; Gerald V. Nelson, Nederland, both of Tex.

[73] Assignee: Texaco Inc., White Plains, N.Y.

[21] Appl. No.: 216,723

[22] Filed: Dec. 15, 1980

[51] Int. Cl.[3] ........................ C01G 21/00; G06G 7/58

[52] U.S. Cl. .................................... 364/501; 364/557; 196/46

[58] Field of Search ............... 364/496, 500, 501, 557; 422/62; 196/46, 14.52

[56] References Cited

U.S. PATENT DOCUMENTS

| | | | |
|---|---|---|---|
| 4,224,674 | 9/1980 | Sequeira et al. | 364/501 |
| 4,231,459 | 11/1980 | Sequeira et al. | 364/501 X |
| 4,236,219 | 11/1980 | Killebrew et al. | 364/501 |
| 4,243,630 | 1/1981 | Kliesch et al. | 364/501 X |
| 4,262,791 | 4/1981 | Lynch et al. | 364/501 X |

*Primary Examiner*—Edward J. Wise

*Attorney, Agent, or Firm*—Carl G. Ries; Robert A. Kulason; Ronald G. Gillespie

[57] ABSTRACT

A control system controls the temperature of kerosine/-diesel fuel being charged to a reactor in a hydro-treating unit. The control system includes a heater which heats the kerosine/diesel fuel in accordance with a control signal corresponding to a desired temperature. A gravity analyzer senses the API gravity of the kerosine/diesel fuel and provides a corresponding signal. A sulfur analyzer senses the sulfur content of the kerosine/diesel and provides a representative signal. A boiling point analyzer senses the 50% boiling point temperature, the initial boiling point temperature and the end point temperature of the kerosine/diesel fuel and provides corresponding signals. A flow rate sensor provides a signal corresponding to the flow rate of the kerosine/diesel fuel entering the heater. A control signal circuit provides the control signal to the heater in accordance with the signals from the gravity analyzer, the sulfur analyzer, the boiling point analyzer and the flow rate sensor.

10 Claims, 13 Drawing Figures

FEEDSTOCK TEMPERATURE CONTROL SYSTEM

BACKGROUND OF THE INVENTION

Field of the Invention

The present invention relates to process control systems in general and, more particularly, to a process control system for a hydrotreating unit.

SUMMARY OF THE INVENTION

A control system controls the temperature of kerosine/diesel fuel charged to a reactor in a hydrotreating unit. The control system includes a heater receiving the kerosine/diesel fuel which heats the kerosine/diesel fuel being provided to the reactor. Gravity, sulfur and boiling point analyzers sample the kerosine/diesel fuel and provide signals corresponding to the API gravity, the sulfur content, the 50% boiling point temperature, the initial boiling point temperature and the end point temperature of the kerosine/diesel fuel. A flow rate sensor senses the flow rate of the kerosine/diesel and provides a corresponding signal. A network provides the control signal to the heater in accordance with the signals from the analyzers and the sensor.

The objects and advantages of the invention will appear more fully hereinafter, from a consideration of the detailed description which follows, taken together with the accompanying drawings, wherein one embodiment is illustrated by way of example. It is to be expressly understood, however, that the drawings are for illustrative purposes only and are not to be construed as defining the limits of the invention.

DESCRIPTION OF THE INVENTION

Figure 1:
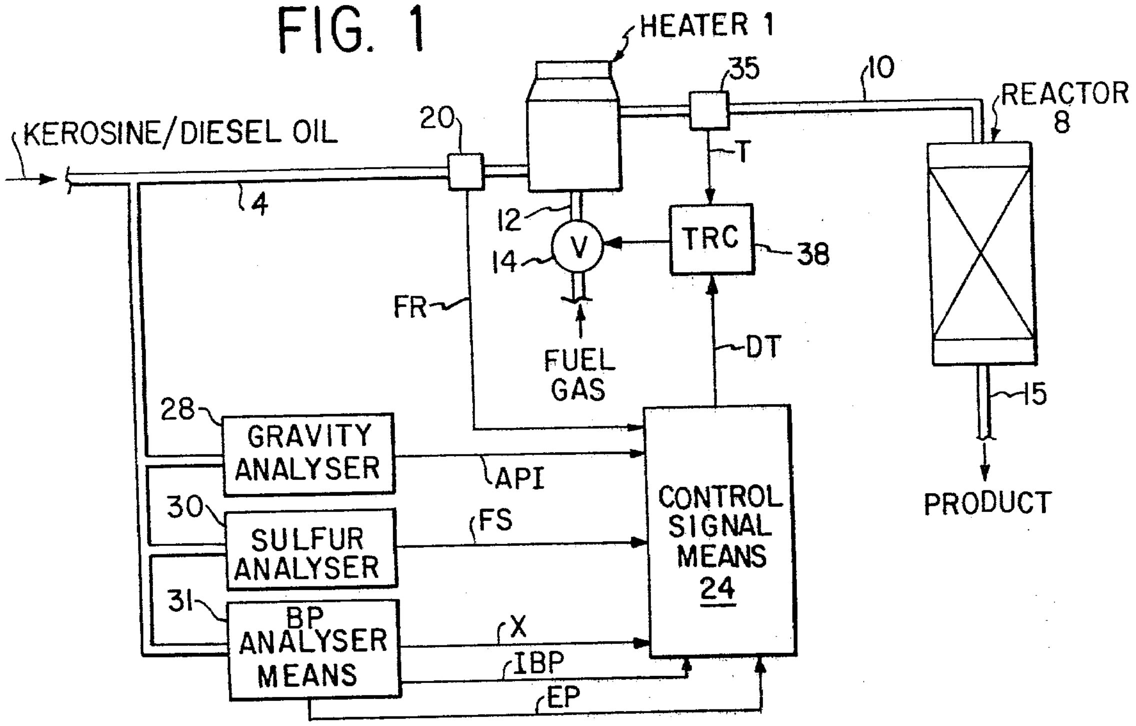
FIG. 1 shows a hydrotreating unit in schematic form and a simplified block diagram of a control system, constructed in accordance with the present invention, for controlling the temperature of kerosine/diesel fuel charged to a reactor in the hydrotreating unit.

A control system controls the temperature of kerosine/diesel fuel stock charged to a reactor in a hydrotreating unit so as to control the sulfur content of the product provided by the unit using the following equations:

$$MW = e^{[C1 + C2(X) + C3(API) - C4(X)^2 + C5(X)(API) - C6(API)^2 + C7(API)^2(X)^2 - C8(X)^3]}, \tag{1.}$$

where MW, API and X are the molecular weight, the API gravity and the 50% boiling point temperature in °F. of the kerosine/diesel fuel, respectively, entering the reactor, and C1 through C8 are constants having preferred values of 3.676093, 0.003125368, 0.00528224, $0.54547885\times10^{-6}$, $0.30253428\times10^{-5}$, $0.1813995\times10^{-4}$, $0.8078238\times10^{-10}$ and $0.1723476\times10^{-9}$, respectively.

$$SF = C9 - C10e^{-C11(X)}, \text{ for } X < 450° \text{ F.} \tag{2a.}$$

$$SF = C9 - C10(X) + C11(X^2), \text{ for } X \geqq 450° \text{ F.} \tag{2b.}$$

where SF is a sulfur factor shich is the distillation temperature at which half of the sulfur in the feedstock is distilled overhead, and C9 through C11 are constants having preferred values of 503.44, 76765 and 0.018726, respectively for equation 2a., and 671.16, 1.2054 and 0.0017689, respectively for equation 2b.

$$R = EP - IBP \tag{3.}$$

where R is the temperature range of the kerosine/diesel feedstock between its initial boiling point temperature (IBP) in °F. and its end point temperature in °F. All boiling points referred to in the application are true boiling point temperatures.

$$A = \{[(SF) + [(API)^{C12}(FS)(R)]/(MW)]\}[C13/R]^{C14} \tag{4.}$$

where A is a feedstock correlating parameter, FS is the weight percent sulfur in the feedstock, and C12, C13 and C14 are constants having a preferred value of 1.1, 100 and 0.05, respectively.

$$CT = C15 + C16(A^2) - C17(A^3) \text{ for 95\% desulfurization} \tag{5a.}$$

$$CT = -C15 + C16(A) - C17(A^2) \text{ for 90\% desulfurization} \tag{5b.}$$

$$CT = C15 - C16e^{-C17(A)} \text{ for 80\% desulfurization} \tag{5c.}$$

$$CT = C15 - C16e^{-C17(A)} \text{ for 70\% desulfurization} \tag{5d.}$$

where CT is a correction temperature for desulfurization, C15, C16 and C17 are constants and have preferred values shown in TABLE I.

TABLE I

| Desulfurization level | C15 | C16 | C17 |
|---|---|---|---|
| 95% (eg 5a.) | 304.73 | 0.001844 | $1.4822\times10^{-6}$ |
| 90% (eg 5b.) | 105.97 | 1.8976 | 0.0011274 |
| 80% (eg 5c.) | 714.8 | 1532 | 0.0043156 |
| 70% (eg 5d.) | 665.3 | 2189 | 0.005415 |

$$K = C18(PLHSV)\left[1/\sqrt{SPS} - 1/\sqrt{FS}\right] \tag{6.}$$

where C18 is a constant having a preferred value of 2.0, K is a reaction rate constant, PLHSV is a predetermined value for the liquid hourly space velocity based on past experience with a particular unit, and SPS is a product sulfur in percent by weight and will be either 5%, 10%, 20% or 30% of the feedstock sulfur for 95%, 90%, 80% or 70% desulfurization, respectively.

$$RT = C19/(CT + C20) \tag{7.}$$

where RT is reciprocal temperature and C19 and C20 are constants having preferred values of $10^4$ and 460, respectively.

$$m = (\ln K1 - \ln K2)/(RT1 - RT2), \tag{8.}$$

where equation 8 is a general slope equation which can be rewritten in a specific form as:

$$m1=(1nK95-1nK90)/(RT95-RT90) \quad 8a.$$

$$m2=(1nK90-1nK80)/(RT90-RT80) \quad 8b.$$

$$m3=(1nK80-1nK70)/(RT80-RT70) \quad 8c.$$

where m1, m2 and m3 are the slopes of straight line segments approximating the kinetic relationship between the reaction rate constants K95, K90, K80 and K70 for 95%, 90%, 80% and 70% desulfurization, respectively, and the reciprocal temperatures RT95, RT90, RT80 and RT70 for 95%, 90%, 80% and 70% desulfurization, respectively.

$$b=1nK1-RT1(m) \quad 9.$$

where equation 9 is a general intercept equation which may be rewritten in specific forms as:

$$b1=1nK95-RT95(m1), \quad 9a.$$

$$b2=1nK90-RT90(m2), \quad 9b.$$

$$b3=1nK80-RT80(m3) \quad 9c.$$

where b1, b2 and b3 are the intercepts of the straight line segments.

$$ALHSV=(FR)/(VC) \quad 10.$$

where ALHSV is the actual liquid hourly space velocity, FR is the flow rate of the kerosine/diesel in barrels per hour, and VC is the volume of catalyst in barrels.

$$Z=(C18)(ALHSV)[(1/\sqrt{DPS}-1/\sqrt{FS}] \quad 11.$$

where Z is the reaction rate constant for a desired product sulfur content DPS.

The desired percent desulfurization DDS necessary to obtain the DPS is controlled by equation 12.

$$DDS=100(FS-DPS)/FS. \quad 12.$$

An equation for the desired temperature DT is derived from equation 7, and the straight line segments; by substituting DT for CT and rewriting as:

$$DT=[(m)(C19)+(b)(C20)-(C20)(1nZ)]/(1nZ-b) \quad 13.$$

where b will be either b1, b2 or b3 depending on the value of DDS.

Referring now to FIG. 1, a hydrotreating unit includes a heater 1 receiving kerosine/diesel fuel feedstock through a line 4, which heats the feedstock as hereinafter explained and provides the heated feedstock to a reactor 8 through a line 10. Heater 1 receives fuel gas through a line 12 having a valve 14. Reactor 8 provides a product through a line 15.

A control system controls the temperature of the feedstock being provided to reactor 8 to control the sulfur content of the product. In this regard, a conventional type flow transmitter 20 located in line 4 senses the flow rate of the feedstock and provides a signal FR to control signal means 24. A gravity analyzer 28 and a sulfur analyzer 30 sample the feedstock and provides signals API and FS, respectively, corresponding to the API gravity and the sulfur content, percent by weight, of the feedstock to control signal means 24. Boiling point analyzer means 31 samples the feedstock and provides signals X, IBP and EP to control signal means 24 corresponding to the 50% boiling point temperature, the initial boiling point temperature and the end point temperature, respectively, of the feedstock. A temperature sensor 35 senses the temperature of the heated feedstock in line 10 and provides a signal T, corresponding to the sensed temperature, to a temperature recorder controller 38. Temperature recorder controller 38 also receives a signal DT from control signal means 24, corresponding to a desired temperature, and controls valve 14 in accordance with the difference between signals T and DT to control the temperature of the heated feedstock in line 10.

Figure 2:
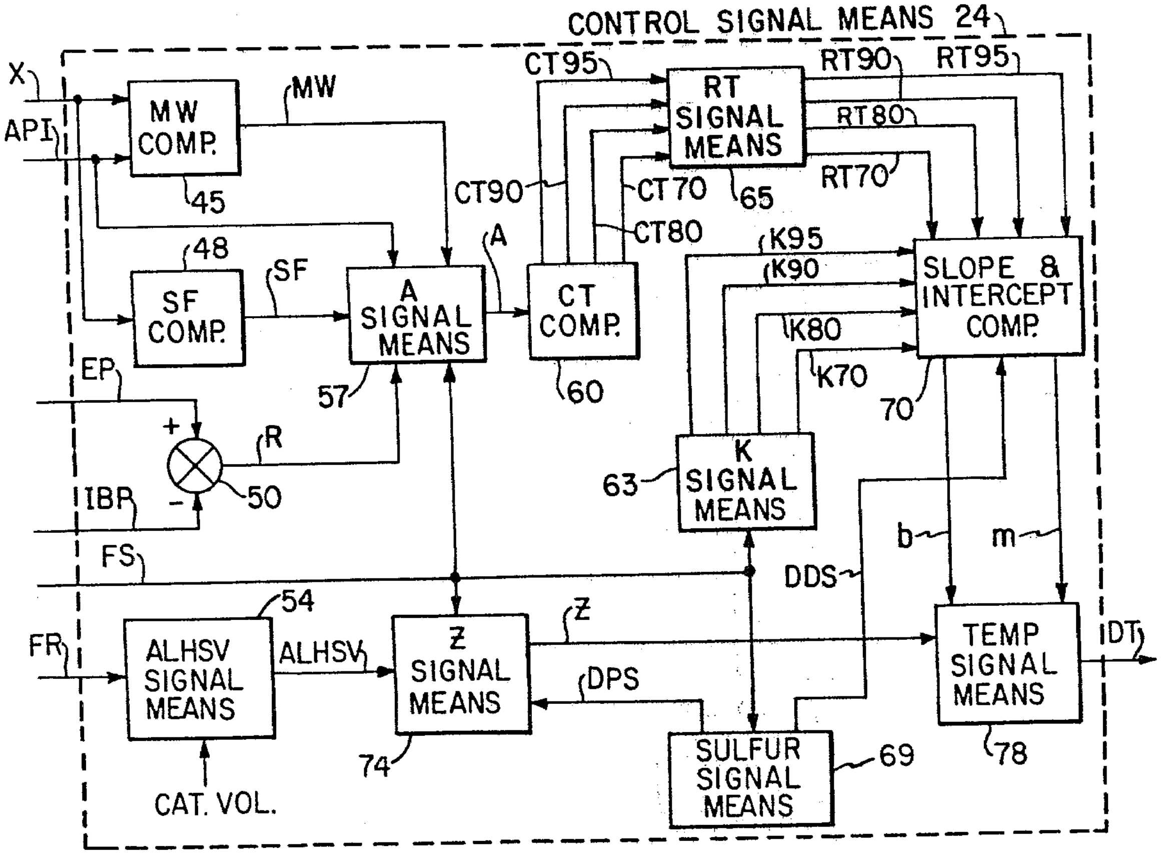
FIG. 2 is a simplified block diagram of the control signal means shown in FIG. 1.

Referring now to FIG. 2, control signal means 24 includes an MW computer 45 receiving signals X and API and providing a signal MW in accordance with signals X and API and equation 1. An SF computer 48 receives signal X and provides signal SF in accordance with equation 2.

Subtracting means 50 subtracts signal IBP from signal EP to provide a signal R corresponding to the temperature range in accordance with equation 3. ALHSV signal means 54 receives signal FR and a direct durrent voltage CAT.VOL., and provides a signal ALHSV in accordance with the received signals and equation 10. A signal means 57 receives signals MW, API, SF, R and FS and provides signal A in accordance with equation 4 to a CT computer 60. CT computer 60 provides signals CT70, CT80, CT90 CT95 to RT signal means 65 in accordance with equations 5a, 5b, 5c and 5d.

K signal means 63 receives signal FS and provides signals K95, K90, K80 and K70 in accordance with equation 6. RT signal means 65 provides signals RT95, RT90, RT80 and RT70 in accordance with equation 7. Sulfur signal means 69 receives signal FS and provides a signal DDS, in accordance with equation 12, to a slope and intercept computer 70 and a signal DPS to Z signal means 74. Slope and intercept computer 70 also receives signals K90, K95, K80, K70, RT90, RT95, RT80 and RT70, and provides signals m and b corresponding to the slope and the intercept of a straight line segment approximating the kinetic relationship between the reaction rate constants and the reciprocal temperatures in accordance with equations 8a, 8b, 8c, 9a, 9b and 9c. Z signal means 74 also receives signals ALHSV and FS and provides signal Z corresponding to the reaction rate constant at a desired product sulfur level in accordance with equation 11. Temperature signal means 78 receives signals Z, b and m and provides signal DT in accordance with equation 12.

Figure 3:
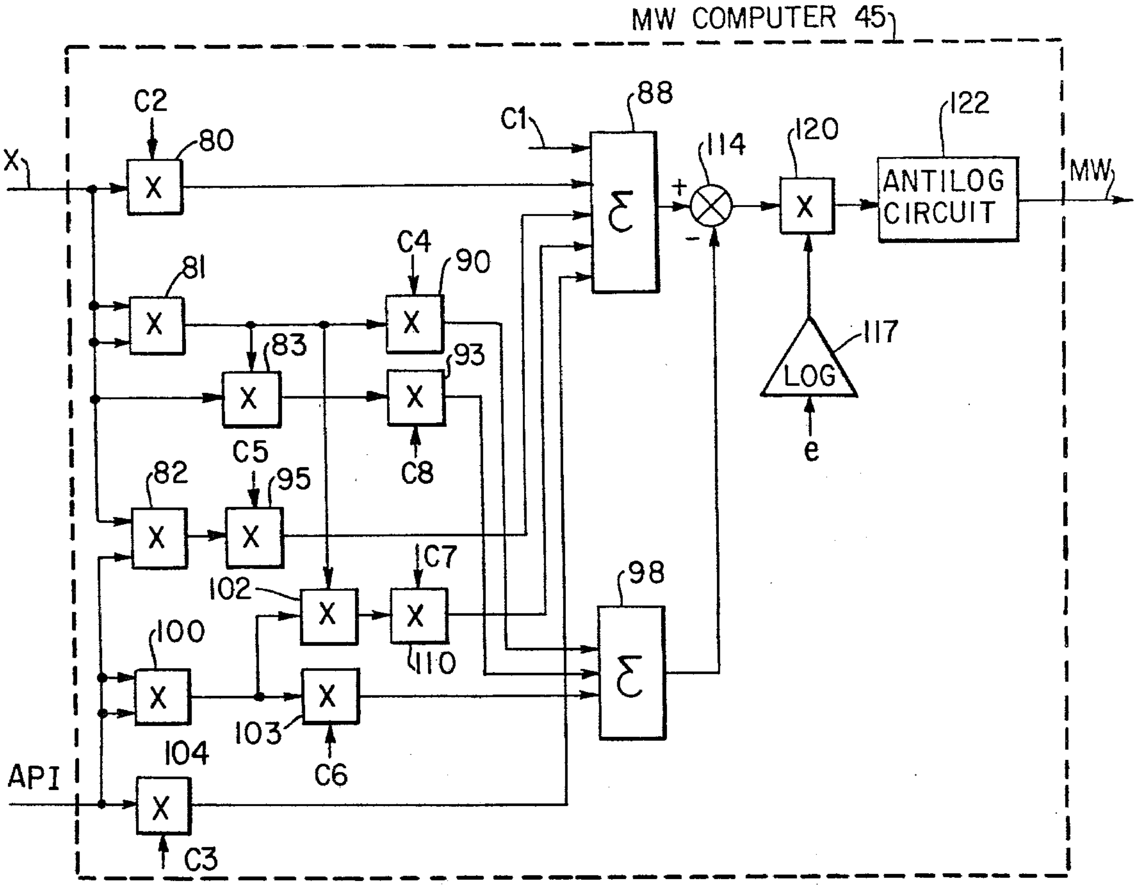
FIGS. 3, 4, 5, 6, 7, 8, 9, 10, 11, 12 and 13 are detailed block diagrams of the MW computer, the SF computer, the ALHSV signal means, the A signal means, the CT computer, the K signal means, the RT signal means, the slope and intercept computer, the Z signal means, the temperature signal means and the sulfur signal means, respectively, shown in FIG. 2.

Referring to FIG. 3, MW computer 45 includes a multiplier 80 which multiplies signal X with a direct current voltage C2 to provide a product signal to summing means 88. A multiplier 81 effectively squares signal X to provide a signal to multipliers 83 and 90. Multiplier 83 multiplies the product signal of multiplier 81 with signal X to provide a signal corresponding to $X^3$ to another multiplier 93. Multiplier 82 multiplies signals X and API to provide a product signal which is multiplied with a direct current voltage C5 by a multiplier 95.

Multipliers 90 and 93 multiply the product signals from multipliers 81 and 83, respectively, with direct current voltages C4 and C8, respectively, to provide product signals to summing means 98. A multiplier 100 effectively squares signal API and provides a product signal to multipliers 102 and 103, while yet another multiplier 104 multiplies signal API with a direct current voltage C3 to provide a product signal to summing means 88. Multiplier 103 multiplies a signal provided by multiplier 100 with direct current voltage C6 to provide a signal to summing means 98. Multiplier 102 multiplies the product signal from multiplier 100 with the product signal from multiplier 81 to provide a product signal which is multiplied with a direct current voltage C7 by a multiplier 110 which provides a corresponding product signal. Summing means 88 effectively sums the positive terms of equation 1 when it sums a direct current voltage C1 with the product signals from multipliers 80, 95, 104 and 110, to provide a corresponding sum signal. Summing means 98 in effect sums all the negative terms of equation 1 when it sums the product signals from multipliers 90, 93 and 103, to provide a signal which is subtracted from the sum signal provided by summing means 88 by subtracting means 114.

A direct current voltage e corresponding to the mathematical constant e is provided to a logarithmic amplifier 117 which provides a signal to a multiplier 120 where it is multiplied with the difference signal provided by subtracting means 114. The product signal provided by multiplier 120 is applied to an antilog circuit 122 which provides signal MW.

Figure 4:
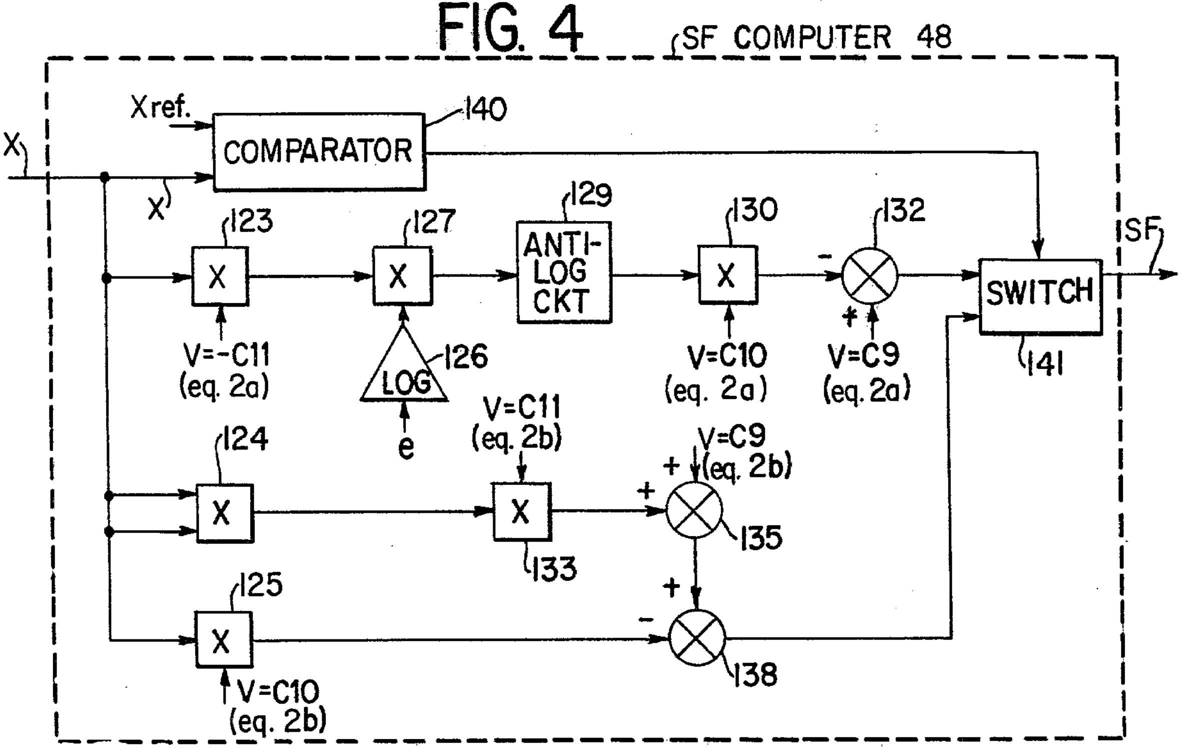

Referring now to FIG. 4, signal X is provided to multiplier 123, 124 and 125 in SF computer 48, where is is multiplied with a direct current voltage corresponding to −C11 in equation 2a, squared and multiplied with a direct current voltage corresponding to C11 in equation 2b and multiplied by a direct current voltage corresponding to C10 in equation 2b. A direct current voltage representative of e is applied to a logarithmic amplifier 126. A multiplier 127 multiplies the signal from multiplier 123 with the signal from amplifier 126 to provide a signal to an antilog circuit 129. Antilog circuit 129 provides a signal corresponding to the term $e^{-C11(x)}$ in equation 2a. A multiplier 130 multiplies the signal from antilog circuit 129 with a direct current voltage, corresponding to C10 in equation 2a, to provide a signal. Subtracting means 132 subtracts to a direct current voltage, representative of C9 in equation 2a, from the signal provided by multiplier 130 to provide a signal which is a valid sulfur factor signal when the 50% boiling temperature is less than 450° F.

A multiplier 133 multiplies the signal from multiplier 124 with a direct current voltage, corresponding to C11 in equation 2b, to provide a signal which is summed with another direct current voltage, representative of C9 in equation 2b, by summing means 135. Subtracting means 138 subtracts the signal provided by multiplier 125 from the signal provided by summing means 125 to provide a signal which is a valid sulfur factor signal when the 50% boiling point temperature of the feedstock is equal to or greater than 450° F.

Signal X is compared with a reference signal X ref, corresponding to a temperature of 450° F., by a comparator 140 whose output controls an electronic single pole, double throw switch 141. When signal X is less than signal X ref, switch 141 passes the signal from subtracting means 132 to provide it as signal SF. When signal X is equal to or greater than signal X ref, switch 141 passes the signal from subtracting means 138 to provide it as signal SF.

Figure 5:
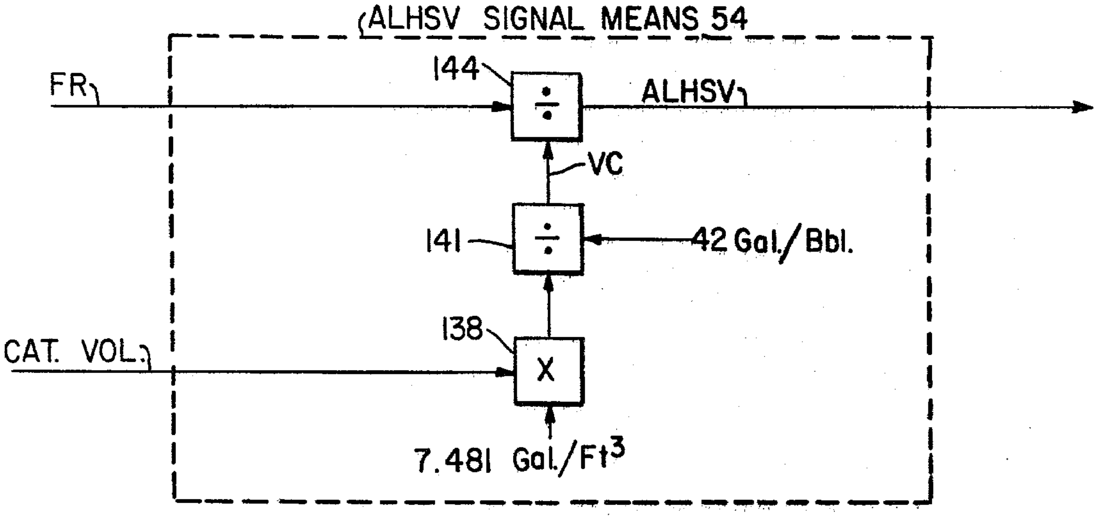

Referring now to FIG. 5, there is shown a multiplier 138 and a divider 141 in ALHSV signal means 54 which converts the catalyst volume that is in cubic feet into barrels. If the catalyst volume is known in the form of barrels, then elements 138, 141 may be omitted. A direct current voltage CAT.VOL. is applied to multiplier 138 where it is multiplied with a direct current voltage corresponding to the constant 7.481 gallons per $foot^3$. The resultant product signal is divided by another direct current voltage corresponding to a constant of 42 gallons per barrel by divider 141 to provide a signal VC corresponding to the catalyst volume in barrels. Divider 144 performs the function of equation 10 by dividing signal FR with the signal from divider 141 to provide signal ALHSV.

Figure 6:
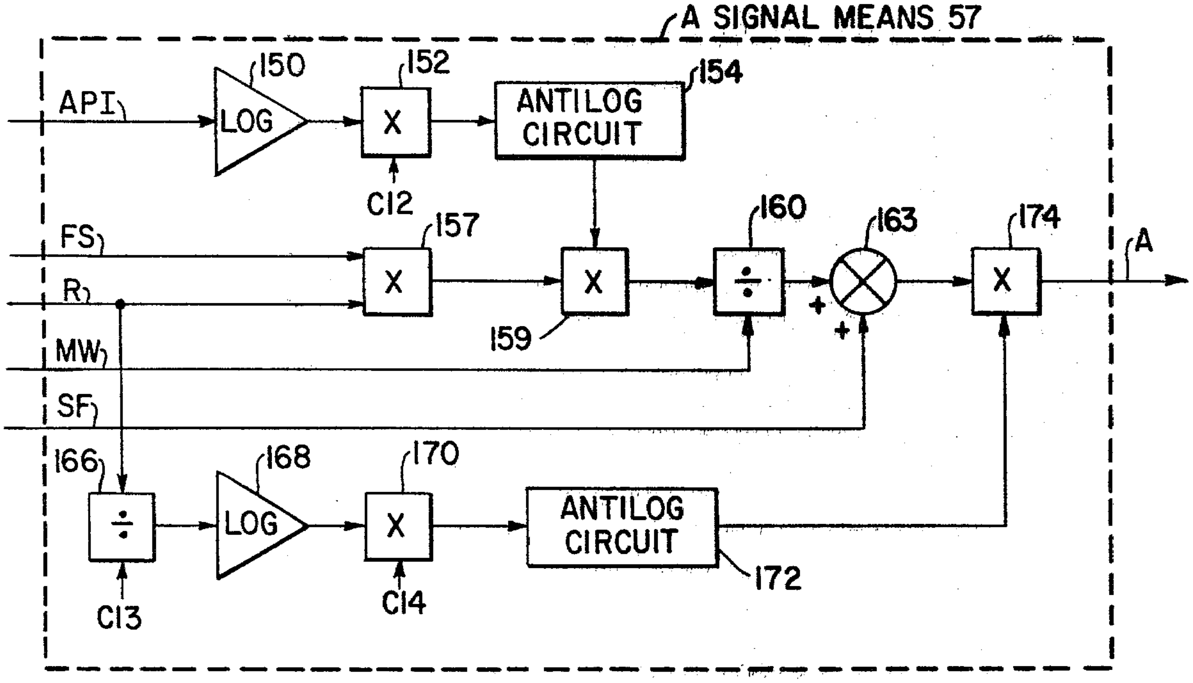

A signal means 57, shown in FIG. 6, includes a logarithmic amplifier 150 receiving signal API and providing a signal which is multiplied with a direct current voltage C12 by a multiplier 152. A product signal provided by multiplier 152 is applied to an antilog circuit 154 which provides a signal corresponding to the term $(API)^{(C12)}$ in equation 4. A multiplier 157 multiplies signals FS and R to provide a product signal which is multiplied with the signal provided by antilog circuit 154 by a multiplier 159. A divider 160 divides the signal provided by multiplier 159 with signal MW to provide a corresponding signal. Summing means 163 sums the signal provided by divider 160 with signal SF. A divider 166 divides a direct current voltage C13 with signal R to provide a signal to a logarithmic amplifier 168. A signal provided by logarithmic amplifier 168 is multiplied with a direct current voltage C14 by a multiplier 170 to provide a corresponding signal to an antilog circuit 172. A multiplier 174 multiplies the sum signal from summing means 163 with the signal from antilog circuit 172 to provide signal A.

Figure 7:
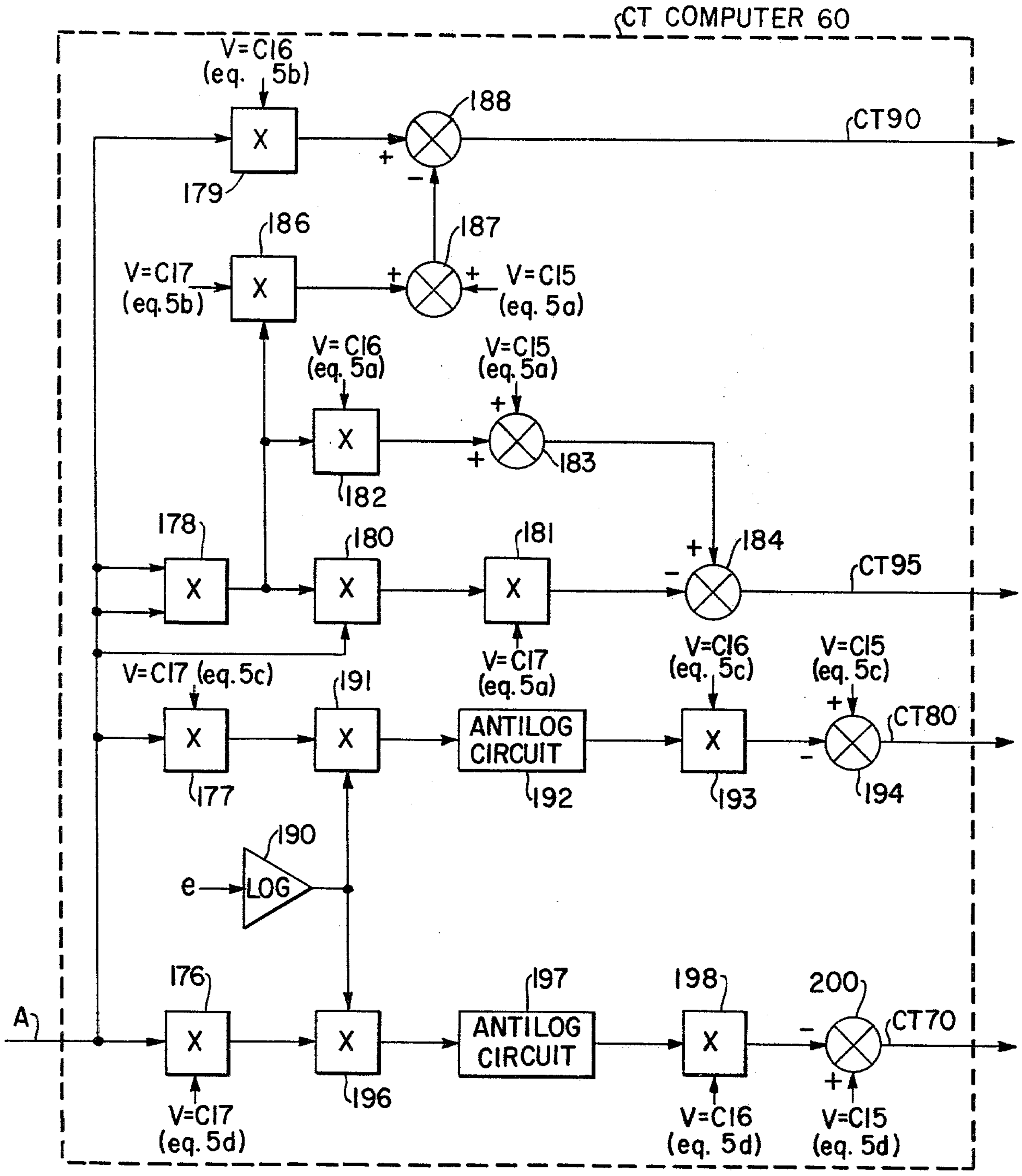

With reference to FIG. 7, signal A is provided to multipliers 176 through 180. Multiplier 178 effectively squares signal A and provides it to multiplier 180 which provides a signal corresponding to $A^3$. The signal from multiplier 180 is multiplied with a direct current voltage, representative of C17 in equation 5a, by a multiplier 181. Another multiplier 182 multiplies the signal from multiplier 178 with a direct current voltage, corresponding to the term C16 in equation 5a, to provide a signal. Summing means 183 sums the signal from multiplier 182 with a direct current voltage representative of C15 in equation 5a, to provide a signal. Substracting means 184 subtracts the signal provided by multiplier 181 from the signal provided by summing means 183 to provide signal CT95.

A multiplier 186 provides a signal in accordance with the signal from multiplier 178 and a direct current voltage corresponding to C17 in equation 5b. The signal from multiplier 186 is summed with a direct current voltage, representative of C15 in equation 5b, by summing means 187 to provide a signal which is subtracted from the signal provided by multiplier 179. Multiplier 179 provided its signal in accordance with signal A and a direct current voltage corresponding to C16 in equation 5b. Subtracting means 188 provides signal CT90.

Multiplier 177 provides a signal in accordance with signal A and a direct current voltage representative of −C17 in equation 5c. A logarithmic amplifier 190 receives a direct current voltage corresponding to e in equations 5c and 5d and provides a signal representative of log e. A multiplier multiplies the log e signal with the signal from multiplier 177 to provide a signal to an antilog circuit 192 which, in turn, provides a signal corresponding to the term $e^{-C17(A)}$ in equation 5c. Multiplier 193 multiplies the signal from antilog circuit 192 with a direct current voltage, representative of C16 in equation 5c to provide a signal. Subtracting means 194 subtracts the signal provided by multiplier 193 from a direct current voltage, representing C15 in equation 5c to provide signal CT80.

Elements 176, 190, 196, 197, 198 and 200 cooperate, in the same manner as elements 177, 190, 191, 192, 193 and 194, to provide signal CT70, the difference being that the direct current voltage provided to multipliers 176 and 198 and subtracting means 200 represents −C17, C16 and C15, respectively, in equation 5d.

Figure 8:
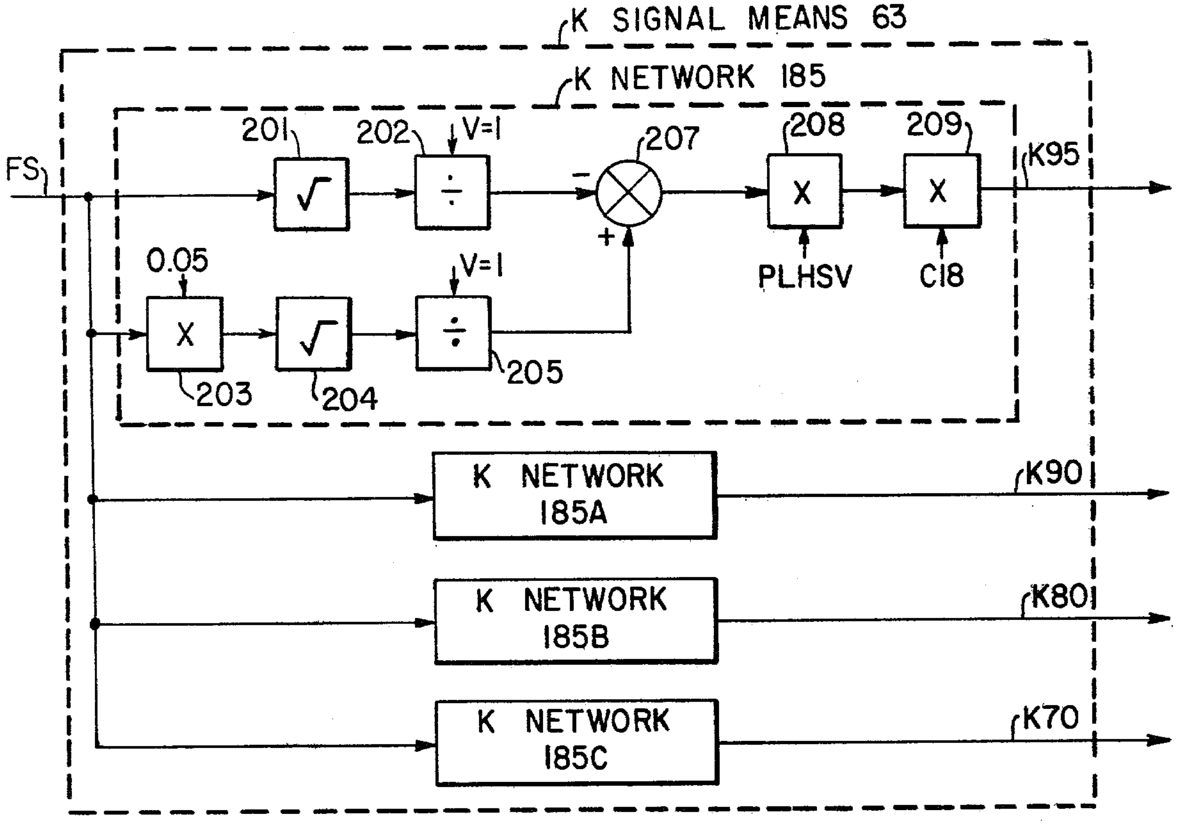

Referring now to FIG. 8, k signal means 63 includes a K network 185 which has a square root circuit 201 which receives signal FS and provides a signal $\sqrt{FS}$ to a divider 202 that divides signal $\sqrt{FS}$ into a direct current voltage corresponding to a value of 1. Signal FS is provided to a multiplier 203 where it is multiplied with direct current voltage corresponding to 0.05 to provide a signal corresponding to the sulfur content of the oil if it were desulfurized by 95%. Multiplier 203 provides the signal to a square root circuit 204 which provides a signal that is divided into the direct current voltage corresponding to a value of 1 by a divider 205. Subtracting means 207 subtracts the signal provided by divider 202 from the signal provided by divider 205 to provide a signal to a multiplier 208 where it is multiplied with a direct current voltage PLHSV corresponding to the predetermined liquid hourly space velocity. The signal provided by multiplier 208 is multiplied with a direct voltage C18 by a multiplier 209 to provide signal K95. K networks 185A, 185B and 185C receive signal FS and are identical to K network 185 except that the value of the direct current voltages applied to multiplier 203 is 0.1, 0.2 or 0.3, respectively, instead of 0.05 so that K networks 185A, 185B and 185C provide signals K90, K80 and K70, respectively, corresponding to the values for K for 90%, 80% and 70% desulfurization, respectively.

Figure 9:
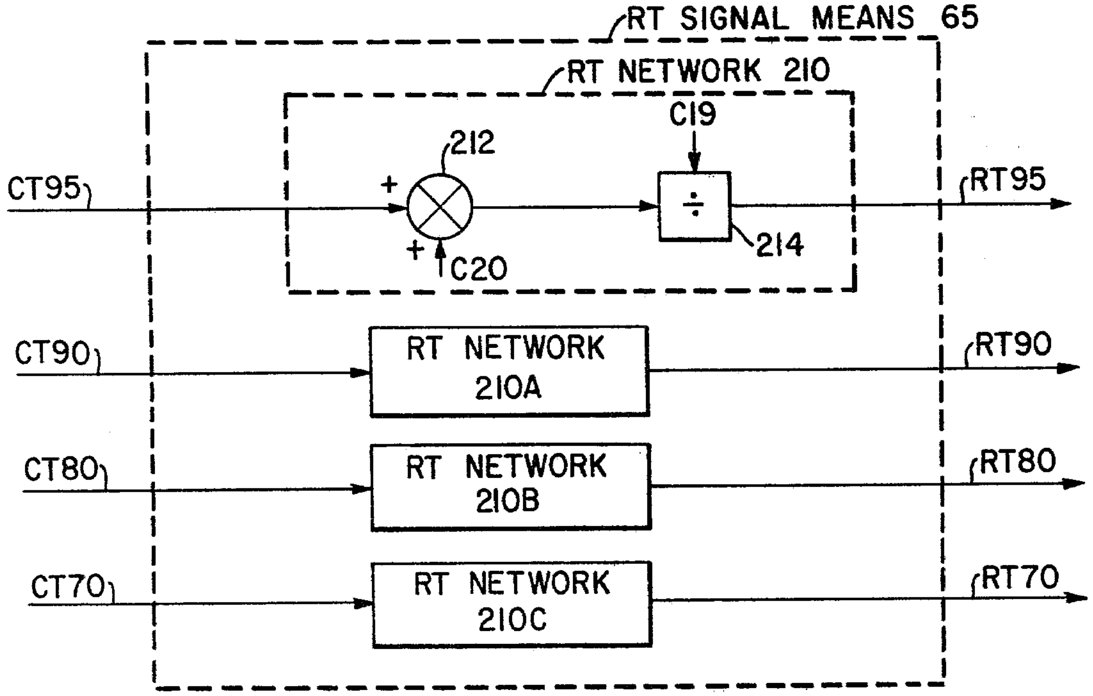

Referring now to FIG. 9, RT signal means 65 includes an RT network 210 which consists of summing means 212 which sums signal CT95 with a direct current voltage, corresponding to the constant C20, to provide a signal corresponding to the term (CT+C20) in equation 7. A divider 214 divides a direct current voltage, representative of the constant C19, with the signal provided by summing means 212 to provide signal RT95. Similarly, RT networks 210A, 210B and 210C provide signals RT90, RT80 and RT70, respectively, in accordance with signals CT90, CT80 and CT70, respectively.

Figure 10:
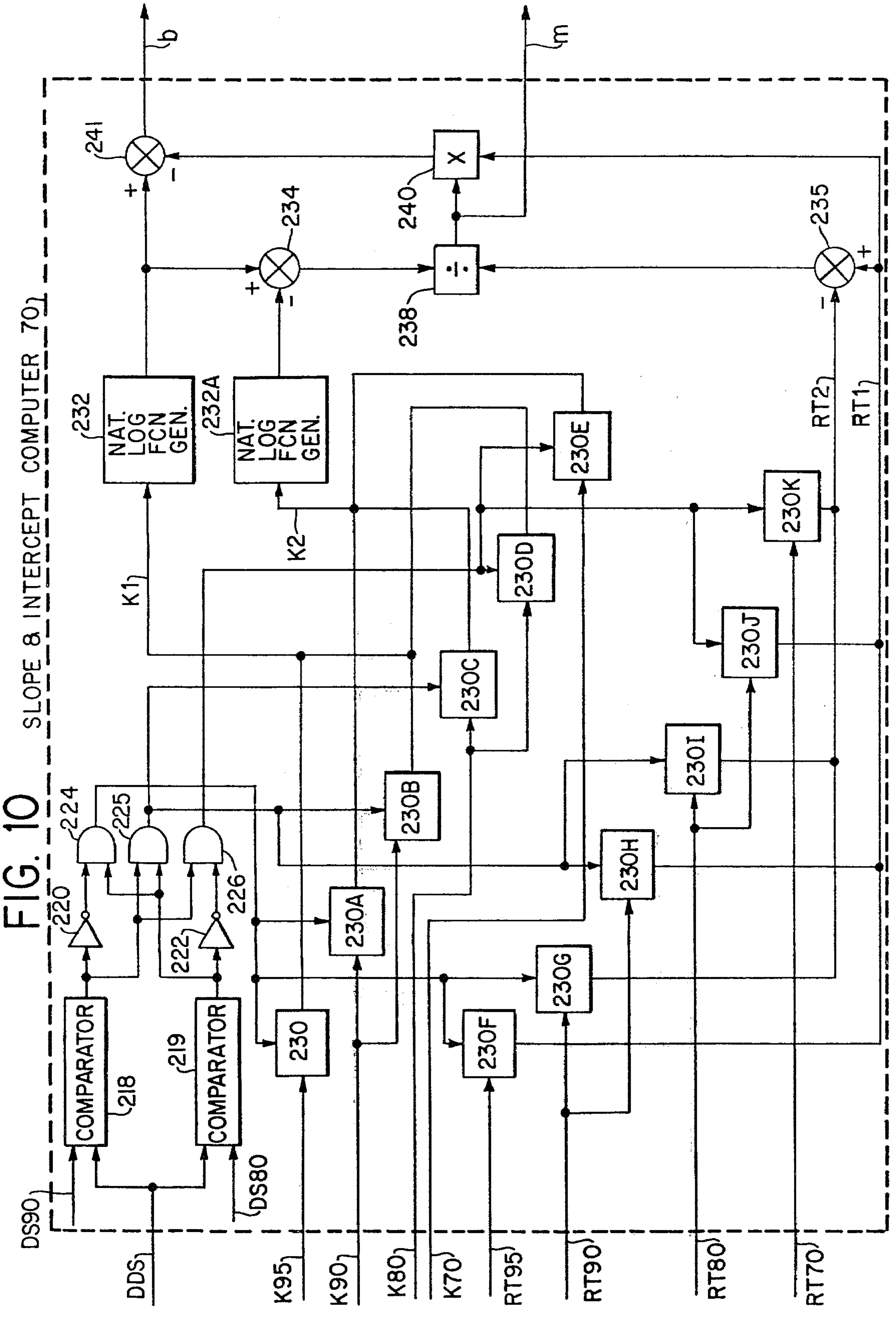

Referring now to FIG. 10, slope and intercept computer 70 includes comparators 218 and 219 receiving signal DDS and reference voltages DS90 and DS80, corresponding to desulfurization levels of 90% and 80%, respectively. The output of comparators 218, 219 are applied to converters 220 and 222, respectively. A trio of AND gates 224, 225 and 226 are connected to comparators 218, 219, and to inverters 220 and 222 as shown in FIG. 10, so that they operate as follows. When the desired desulfurization is greater than 90 percent, comparators 218, 219 provide a low level output and a high logic level output, respectively. Inverters 220 and 222 invert the outputs from comparators 218 and 219 to high level output and a low level output, respectively. As a result, AND gate 224 is enabled by the high logic level outputs from inverter 220 and comparator 219 to provide a high logic level output. AND gates 225 and 226 are disabled by the low level outputs from comparator 218 and inverter 222, respectively.

The high logic level output from AND gate 224 renders switches, 230, 230A, 230F and 230G conductive to pass signals K95, K90, RT95 and RT90 so as to pass them as signals K1, K2, RT1 and RT2, respectively, to natural log function generators 232, 232A and to subtracting means 235, respectively. Natural log function generator 232A provides a signal corresponding to the term 1n K2 in equation 8, which is subtracted from the signal provided by natural log function generator 232 by subtracting means 234. Subtracting means 235 subtracts signal RT2 from signal RT1. A divider 238 divides the signal from subtracting means 235 into the signal from subtracting means 234 to provide signal m which for the present situation is m=m1 in equation 8a. A multiplier 240 multiplies signal m with signal RT1 to provide a signal which is subtracted from the signal provided by natural log function generator 232 by subtracting means 241 to provide signal b. In the present instance, signal b corresponds to b1 in equation 9a.

When signal DDS is less than reference voltage DS90 and greater than reference voltage DS80, AND gate 225 is fully enabled to provide a high logic level output while AND gates 224 and 226 are disabled. The high logic output from AND gate 225 renders switches 230B, 230C, 230H and 230I conductive to pass signals K90, K80, RT90 and RT80, respectively, thereby providing them as signals K1, K2, RT1 and RT2, respectively, with the result that signals m and b now correspond to m2 and b2 in equations 8b and 9b, respectively.

For the condition that signal DDS is less than reference voltage DS80, AND gate 226 is fully enabled while AND gates 224 and 225 are disabled. The resulting high logic level output from AND gate 226 enables switches 230D, 230E, 230J and 230K to pass signals K80, K70, RT80 and RT70, respectively, so as to provide them as signals K1, K2, RT1 and RT2, respectively, with the result that signals m and b now correspond to m3 and b3 in equations 8c and 9c.

Figure 11:
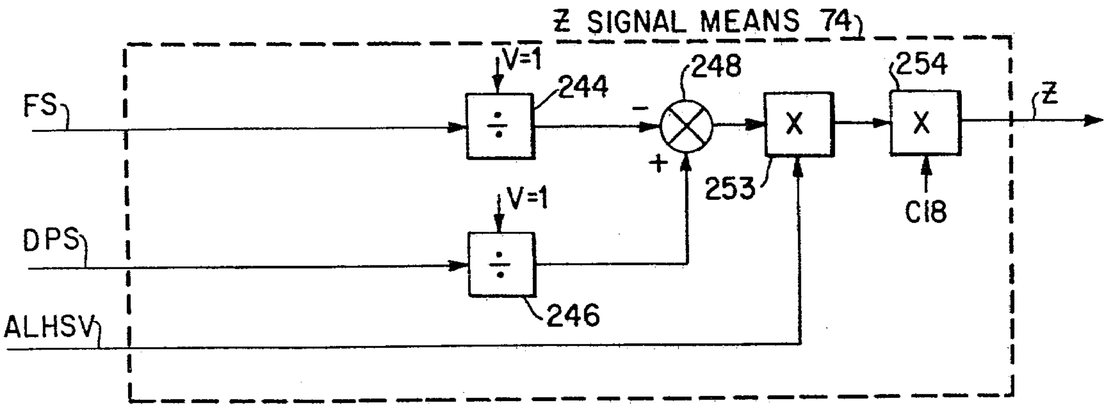

Z signal means 74 shown in FIG. 11 includes square root circuits 242, 243 receiving signals FS and DPS, respectively. Divider 244 divides a direct current voltage corresponding to the value of 1 by the signal provided by square root circuit 242. Divider 246 divides the signal from square root circuit 243 into the direct current voltage corresponding to the value of 1 to provide a signal which has the signal from divider 244 subtracted from it by subtracting means 248. Signal ALHSV is multiplied with the difference signal from subtracting means 248 by a multiplier 253. Multiplier 253 provides a signal to a multiplier 254 where it is multiplied with a direct current voltage corresponding to constant C18 to provide signal Z.

Figure 12:
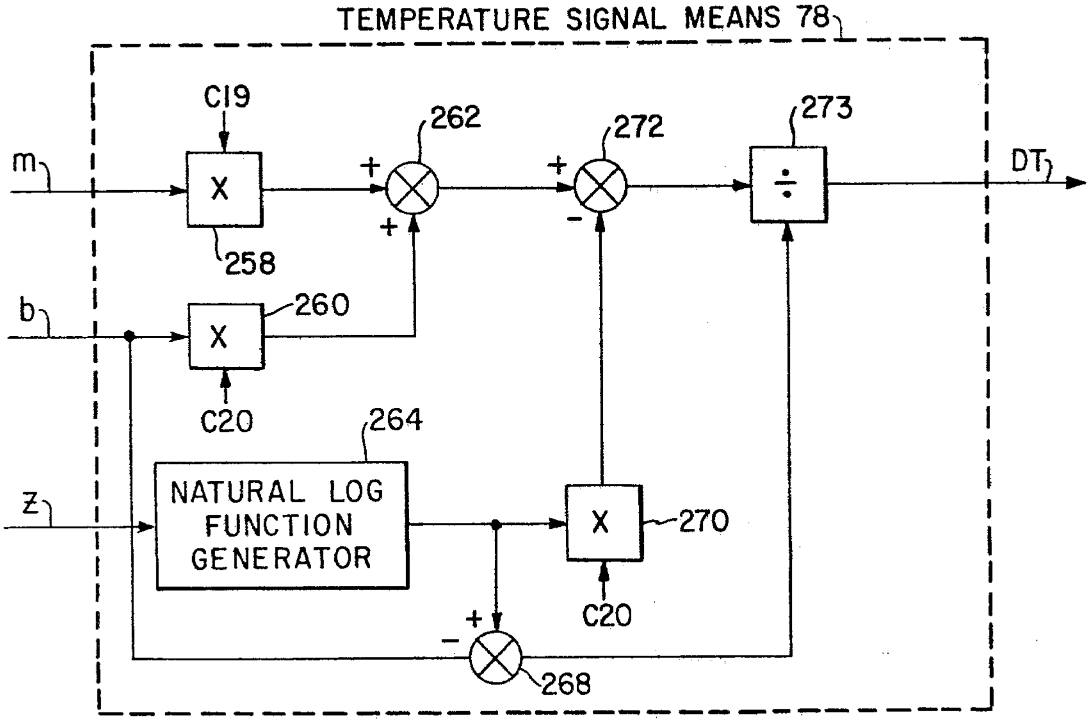

Referring now to FIG. 12, temperature signal means 78 includes multipliers 258 and 260 multiplying signals m and b, respectively, with direct current voltages, corresponding to constants C19 and C20, respectively, to provide corresponding product signals which are summed by summing means 262. A natural log function generator 264 provides a signal corresponding to the natural log of signal Z which has signal b subtracted from it by subtracting means 268 and which is multiplied with voltage C20 by a multiplier 270. The product signal provided by multiplier 270 is subtracted from the signal provided by summing means 262 by subtracting means 272 to provide a signal which is divided by the signal from subtracting means 268 by a divider 273. Divider 273 provides signal DT.

Figure 13:
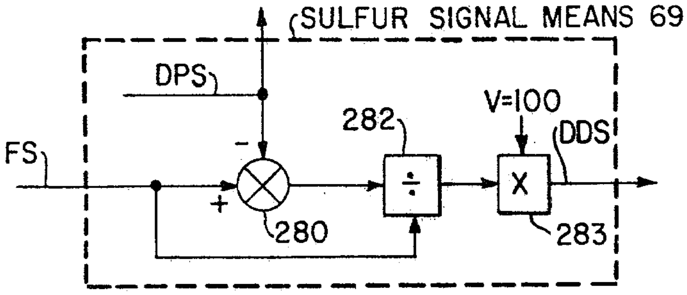

Referring to FIG. 13, a direct current voltage is provided as signal DPS in sulfur signal means 69. Signal DPS is subtracted from signal FS by subtracting means 280 to provide a difference signal. Signal FS is divided into the difference signal by a divider 282. The resulting signal is multiplied by a direct current voltage equivalent to 100 in multiplier 283 to provide signal DDS in accordance with equation 12.

It should be noted in the foregoing description, that direct current voltages identified as C with a numeric designation correspond to the constants in the equations having the numeric designations. It also should be noted that the present invention may also be practiced by one skilled in the art using a specially programmed general purpose digital computer or a microprocessor in cooperation with the appropriate sensors, analyzers and control devices utilizing conventional analog-to-digital and digital-to-analog converters as necessary, so that the present invention is not restricted to use of an analog computer.

What is claimed is:

1. A control system for controlling the temperature of kerosine/diesel fuel feedstock being fed to a reactor in a hydrotreating unit comprising heater means receiving the feedstock for heating the feedstock in accordance with a control signal DT corresponding to a desired temperature for the feedstock entering the reactor and providing the heated feedstock to the reactor, gravity analyzer means for sensing the API gravity of the feedstock and providing a signal API corresponding thereto, sulfur analyzer means for sensing the sulfur content of the feedstock and providing a corresponding signal FS, boiling point analyzer means for sensing the 50% boiling point temperature, the initial boiling point temperature and the end point temperature of the feedstock and providing corresponding signals X, IBP and EP, respectively, flow rate means for sensing the flow rate of the feedstock and providing a signal FR representative thereof, and control signal means connected to the heater means, to the gravity analyzer means, to the sulfur analyzer means, to the boiling point analyzer means and to the flow rate means for providing control signal DT in accordance with signals API, FS, X, IBP, EP and FR, said control signal means includes means connected to the boiling point analyzer means and to the gravity analyzer means for providing a signal MW corresponding to the molecular weight of the feedstock in accordance with signals X and API, SF computer means connected to the boiling point analyzer means for providing a signal SF corresponding to a sulfur factor of the gas oil which is at the estimated distillation temperature at which half of the sulfur in the feedstock is distilled overhead, in accordance with signal X and $$SF = C9 - C10e^{-C11(X)} \quad \text{1a.}$$

when the value for X is less than 450° F., and $$SF = C9 - C10(X) + C11(X^2) \quad \text{1b.}$$

when the value for X is equal to or greater than 450° F., where C9, C10 and C11 are constants having one set of values for equation 1a and another set of values for equation 1b, subtracting means connected to the boiling point analyzer means for subtracting signal IBP from signal EP to provide signal R corresponding to the temperature range of the kerosine/diesel fuel, ALHSV signal means connected to the flow rate means and receiving a direct current voltage CAT.VOL. corresponding to the catalyst volume of the reactor in barrels for providing a signal ALHSV corresponding to the actual liquid hourly space velocity of the kerosine/diesel fuel in accordance with signal FR and the voltage CAT VOL, A signal means connected to the MW computer means, to the SF computer means, to the subtracting means, to the sulfur analyzer means and to the gravity analyzer means for providing a signal A corresponding to a feedstock correlating parameter in accordance with signals MW, SF, R, FS and API, CT computer means connected to the A signal means for providing signals CT95, CT90, CT80 and CT70, corresponding to the correction temperature for 95%, 90%, 80% and 70% desulfurization, respectively, RT signal means connected to the CT signal means for providing signals RT95, RT90, RT80 and RT70 corresponding to the reciprocal temperatures for 95%, 90%, 80% and 70% desulfurization, respectively, in accordance with signals CT95, CT90, CT80, and CT70, sulfur signal means for providing a signal DPS corresponding to the desired product sulfur content and a signal DDS corresponding to a percent desulfurization necessary to achieve the desired product sulfur content in accordance with signal FS, K signal means connected to the sulfur analyzer means for providing signals K95, K90, K80 and K70, corresponding to reaction rate constants for 95%, 90%, 80% and 70% desulfurization, respectively, in accordance with signal FS, slope and intercept signal means connected to the RT signal means, to the sulfur signal means and to the K signal means for providing signals m and b corresponding to the slope and intercept, respectively, of a straight line approximating the kinetic relationship between the reaction rate constant and the reciprocal temperatures in accordance with signals DDS, RT95, RT90, RT80, RT70, K95, K90, K80 and K70, Z signal means connected to the ALHSV signal means, to the sulfur analyzer means and to the sulfur signal means for providing a signal Z corresponding to a reaction rate constant for the desired product sulfur content in accordance with signals ALHSV, FS and DPS, and temperature signal means connected to the slope and intercept signal means and to the Z signal means for providing signal DT in accordance with signals m, b, and Z.

2. A control system as described in claim 1 in which the MW computer means includes MW signal means receiving direct current voltages corresponding to terms C1 through C8 and e, signals X and API for providing signal MW in accordance with the received signals and voltages and the following equation:

$$MW = e^{[C1 + C2(X) + C3(API) - C4(X)^2 + C5(X)(API) - C6(API)^2 + C7(API)^2(X)^2 - C8(X)^3]},$$

where C1 through C8 are constants.

3. A control system as described in claim 2 in which the ALHSV signal means also receives a direct current voltage VC corresponding to the volume of the catalyst in the reactor in barrels and provides signal ALHSV in accordance with signal FR, a direct current voltage VC corresponding to the volume of catalyst in the reactor in accordance with the following equation:

$$ALHSV = (FR)/(VC).$$

4. A control system as described in claim 3 in which the A signal means also receives direct current voltages corresponding to terms C12 through C14 and provides signal A in accordance with signals SF, API, FS, R and MW, the received voltages and the following equation:

$$A=\{[(SF)+[(API)^{C12}(FS)(R)]/(MW)]\}[C13/R]^{C14}$$

where C12 through C14 are constants.

5. A control system as described in claim 4 in which the CT computer means includes CT95 signal means connected to the A signal means and receiving direct current voltages corresponding to constant C15 and C16 for 95% desulfurization for providing signal CT95 in accordance with signal A, the direct current voltages and the following equation:

$$CT95=C15+C16(A^2)-C17(A^3)$$

where C15, C16 and C17 are constants for 95% desulfurization, and CT90 signal means connected to the A signal means and receiving direct current voltages corresponding to constants C15 and C16 for 90% desulfurization for providing signal CT90 in accordance with signal A and the received voltages in accordance with the following equation:

$$CT90=-C15+C16(A)-C17(A^2),$$

where C15, C16 and C17 are constants for 90% desulfurization, CT80 signal means connected to the A signal means and receiving direct current voltages corresponding to constant C15, C16 and C17 for 80% desulfurization for providing signal CT80 in accordance with signal A, the received voltages and the following equation:

$$CT80=C15-C16e^{-C17(A)},$$

and CT70 signal means connected to the A signal means and receiving direct current voltages corresponding to constants C15 and C16 for 70% desulfurization for providing signal CT90 in accordance with signal A and received voltages in accordance with the following equation:

$$CT70=C15-C16e^{-C17(A)},$$

where C15, C16 and C17 are constants for 70% desulfurization.

6. A control system as described in claim 5 in which the K signal means includes K95 signal means connected to the sulfur analyzer means and receiving direct current voltages corresponding to a constant C18, to a value of 1 and PLHSV representative of a predetermined value for the liquid hourly space velocity for the hydrotreating unit and providing signal K95 in accordance with signal FS, the received voltages and the following equation:

$$K95 = C18(PLHSV)\left[1/\sqrt{SPS} - 1/\sqrt{FS}\right]$$

where SPS corresponds to 5% of FS, K90 signal means connected to the sulfur analyzer means and receiving direct current voltages corresponding to a constant C18, to a value of 1, and to PLHSV for providing a signal K90 in accordance with signal FS, the received voltages and the following equation:

$$K90 = C18(PLHSV)\left[1/\sqrt{SPS} - 1/\sqrt{FS}\right]$$

where SPS corresponds to 10% of FS, K80 signal means connected to the sulfur analyzer means and receiving direct current voltages corresponding to a constant C18, to a value of 1, and PLHSV, for providing signal K80 in accordance with signal FS, the received voltages and the following equation:

$$K80 = C18(PLHSV)\left[1/\sqrt{SPS} - 1/\sqrt{FS}\right]$$

where SPS corresponds to 20% of FS, and K70 signal means connected to the sulfur analyzer means and receiving direct current voltages corresponding to a constant C18, to a value of 1, and to PLHSV for providing signal K70 in accordance with signal FS, the received voltages and the following equation:

$$K70 = C18(PLHSV)\left[1/\sqrt{SPS} - 1/\sqrt{FS}\right]$$

where SPS corresponds to 30% of FS.

7. A control system as described in claim 6 in which the RT signal means includes RT95 signal means connected to the CT95 signal means and receiving direct current voltages corresponding to constants C19 and C20 for providing signal RT95 in accordance with signal CT95, the received voltages and the following equation:

$$RT95=C19/(CT95+C20),$$

RT90 signal means connected to the CT90 signal means and receiving the direct current voltages corresponding to constants C19 and C20 for providing signal RT90 in accordance with signal CT90, the received voltages and the following equation:

$$RT90=C19/(CT90+C20),$$

RT80 signal means connected to the CT80 signal means and receiving direct current voltages corresponding to constants C19 and C20 for providing signal RT80 in accordance with signal CT80, the received voltages and the following equation:

$$RT80=C19/(CT80+C20),$$

and RT70 signal means connected to the CT70 signal means and receiving the direct current voltages corresponding to constants C19 and C20 for providing signal RT70 in accordance with signal CT70, the received voltages and the following equation:

$$RT70=C19/(CT70+C20).$$

8. A control system as described in claim 7 in which the slope and intercept signal means includes comparing means connected to the sulfur signal means and receiving reference voltages corresponding to 80% and 90% desulfurization levels for comparing signal DDS with the reference voltages and providing control signals in accordance with the comparison, first switch means connected to the K95 signal means, to the K90 signal means, to the K80 signal means, to the K70 signal means and to the comparing means for selecting signals from signals K95, K90, K80 and K70, and providing them as signals K1 and K2, second switch means connected to the RT95 signal means, to the RT90 signal means, to the RT80 signal means, to the RT70 signal means and to the comparing means for selecting two signals from signals RT95, RT90, RT80 and RT70 and providing them as signals RT1 and RT2 in accordance with the control signals from the comparing means, slope means connected to the first and second switch means for providing signal m in accordance with the signals K1, K2, RT1 and RT2 and the following equation:

$$m=(\ln K1-\ln K2)/(RT1-RT2)$$

and for providing a signal corresponding to the natural log of the signal K1, and intercept means connected to the slope means for providing signal b in accordance with the signal m and the signal corresponding to the natural log of signal K1 and the following equation:

$$b=\ln k1-RT1(m).$$

9. A control system as described in claim 8 in which the Z signal means also receives a direct current voltage corresponding to a value of 1 and provides a signal Z in accordance with signals FS, DPS and ALHSV, the received voltage and the following equation:

$$Z=(C18)(ALHSV)\left[\left(1/\sqrt{DPS}-1/\sqrt{FS}\right)\right],$$

where C18 is a constant.

10. A control system as described in claim 9 in which the temperature signal means receives direct current voltages C19 and C20 and provides signal DT in accordance with signal m, b and Z, the received voltages and the following equation:

$$DT=[(m)(C19)+b(C20)-(C20)(\ln Z)]/(\ln Z-b),$$

where C19 and C20 are constants.

* * * * *